US009647839B2

(12) United States Patent
Lucas

(10) Patent No.: US 9,647,839 B2
(45) Date of Patent: May 9, 2017

(54) PASSWORD GENERATION AND RETRIEVAL SYSTEM

(71) Applicant: Jim Lucas, Fort Myers, FL (US)

(72) Inventor: Jim Lucas, Fort Myers, FL (US)

( * ) Notice: Subject to any disclaimer, the term of this patent is extended or adjusted under 35 U.S.C. 154(b) by 0 days.

(21) Appl. No.: 14/454,994

(22) Filed: Aug. 8, 2014

(65) Prior Publication Data
US 2015/0082046 A1 Mar. 19, 2015

Related U.S. Application Data

(60) Provisional application No. 61/864,549, filed on Aug. 10, 2013.

(51) Int. Cl.
*H04L 29/06* (2006.01)
*H04L 9/32* (2006.01)
*G06F 21/46* (2013.01)

(52) U.S. Cl.
CPC .......... *H04L 9/3226* (2013.01); *G06F 21/46* (2013.01); *H04L 63/083* (2013.01)

(58) Field of Classification Search
CPC ... H04L 9/3226; H04L 9/3236; H04L 63/083; G06F 21/46
USPC ......................................................... 713/184
See application file for complete search history.

(56) References Cited

U.S. PATENT DOCUMENTS

| | | | |
|---|---|---|---|
| 7,353,536 B1* | 4/2008 | Morris et al. ...................... 726/6 |
| 8,261,086 B2* | 9/2012 | Li et al. .......................... 713/183 |
| 2001/0037211 A1* | 11/2001 | McNutt et al. ................... 705/1 |
| 2003/0131266 A1* | 7/2003 | Best ........................ G06F 21/46 713/184 |
| 2004/0135805 A1* | 7/2004 | Gottsacker ............ G06F 17/211 715/751 |
| 2009/0024531 A1* | 1/2009 | Yamahata et al. .............. 705/55 |
| 2009/0307767 A1* | 12/2009 | Semba ..................... G06F 21/34 726/18 |
| 2010/0241865 A1* | 9/2010 | Chang ..................... G06F 21/31 713/184 |
| 2011/0202984 A1* | 8/2011 | Hird et al. ......................... 726/7 |
| 2012/0173870 A1* | 7/2012 | Reddy et al. .................. 713/153 |
| 2013/0117805 A1* | 5/2013 | Kent et al. ......................... 726/1 |
| 2013/0124292 A1* | 5/2013 | Juthani .................... G06F 21/41 705/14.26 |
| 2013/0346302 A1* | 12/2013 | Purves ................. G06Q 20/102 705/40 |
| 2014/0033281 A1* | 1/2014 | Asahi .................... H04L 63/083 726/4 |
| 2014/0101197 A1* | 4/2014 | Charytoniuk ................. 707/770 |

* cited by examiner

*Primary Examiner* — Don Zhao
(74) *Attorney, Agent, or Firm* — Livingston Loeffler, P.A.; Edward M. Livingston, Esq.; Bryan L. Loeffler, Esq.

(57) ABSTRACT

The present invention seeks to meet these needs by providing a password generation and retrieval system (PGRS) that generates encrypted passwords with a computer program using an algorithm that combines a website information such as a domain name or email address, the user's own text input or phrase, and the user's own numeric value or pin number. The present invention does not involve the maintenance of a database of any kind. As such, there is no login required and no records are kept of the visitors, their input or the passwords generated. Preferably, the process is carried out using a website, browser extension, smart phone application and/or a stand-alone executable program.

19 Claims, 1 Drawing Sheet

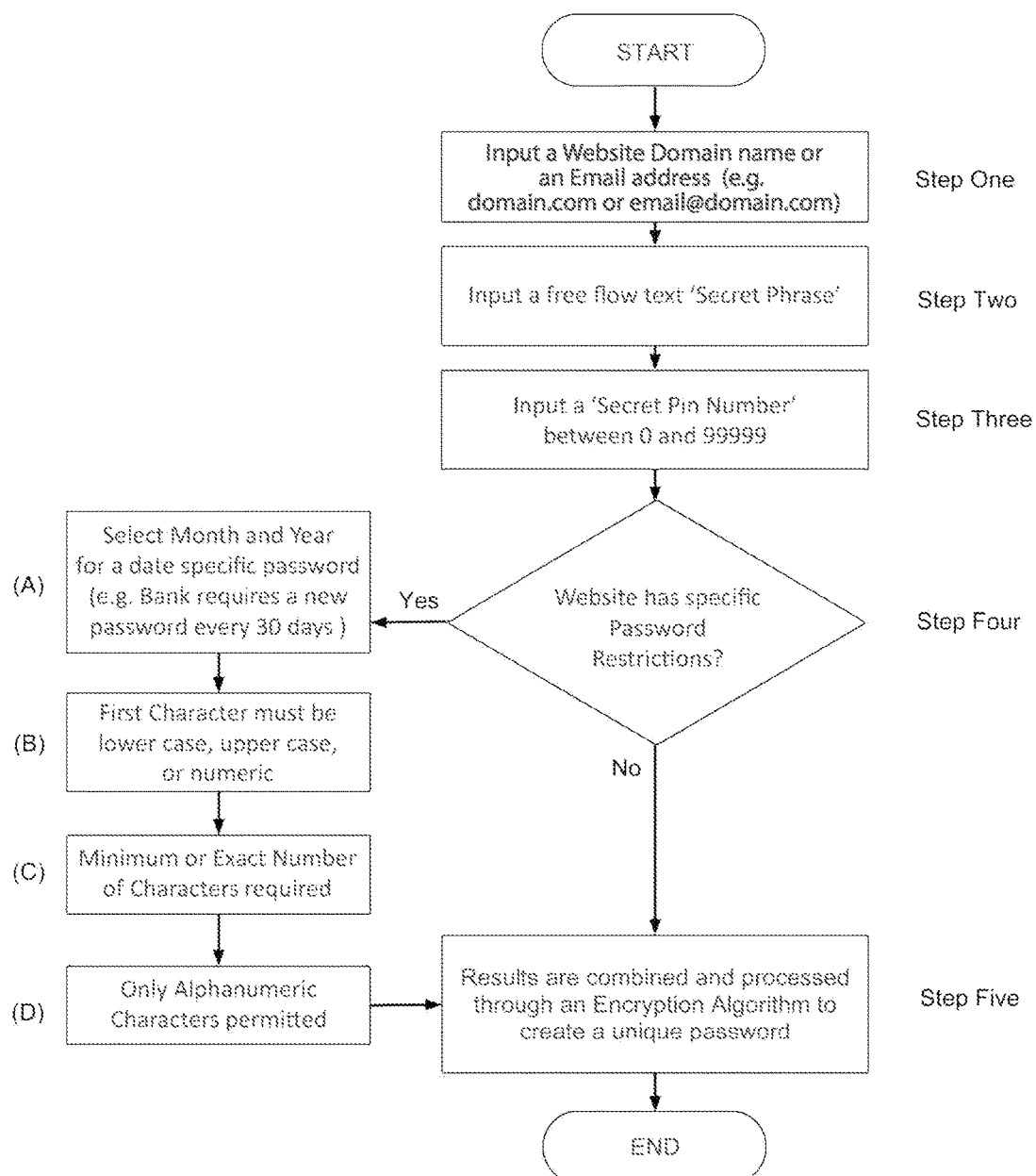

PASSWORD GENERATION AND RETRIEVAL SYSTEM

RELATED APPLICATIONS

This application claims priority to U.S. Provisional Application No. 61/864,549 filed Aug. 10, 2013. The entire contents of the above application are hereby incorporated by reference as though fully set forth herein.

FIELD

The present invention generally relates to computer and network security systems and in particular to providing security utilizing secure passwords. Still more particularly, the present invention relates to increased password security.

BACKGROUND

Almost all modern computer networks and web applications have a user password to access encrypted personal and sensitive data. Many times, the password themselves are encrypted. The reason for encryption of passwords is that the password itself is sensitive personal data. Passwords are the key to a user's privacy, so they are personal, sensitive and not even the web application or network host should know them. If the password to a web application or database is compromised, then all the data is compromised as well. There are many methods used to create and store complex passwords for users, but even those methods are not infallible if the password is not strong enough, as a brute force attack (iteratively trying every possible value) or a dictionary attack (trying a subset of preferred values) can still reveal the password. Some of these tools to carry out these attacks are even available on the Internet, for example the John the Ripper password cracker.

Users with weak passwords are often victims of hackers and spammers who exploit security holes in computer systems. For example, a hacker can crack a weak password on an email account and the hacker uses the account to circulate spam or even commit identify theft. A weak password also opens computer networks to worms, trojans, spyware and other forms of malware used to infect the computers of people visiting the site. As such, it is generally recommended that a strong password is at least six to eight characters in length and should contain a mixture of numbers, letters (both uppercase and lowercase), and symbols. However, these passwords are often difficult to remember. Putting the password on a sticky note next to the computer monitor represents a security risk as does keeping a Word document, notepad file, or excel spreadsheet that contains all sites and passwords. Often times, users will use the same password for multiple sites. If one site is breached, such as email, then often another site can be breached, such as one used for banking.

It is possible to encrypt a "master" document containing these strong passwords, but if that master file is lost, corrupted, deleted, stolen, destroyed, breached or the user forgets the master password, the data can be forever lost. While there are password repository websites and Internet browsers that save passwords, these can also be breached and their databases revealed or hacked and shared. Further, these sites require a user to create a login credentials to an account that saves their passwords in a database for future retrieval, thereby keeping records of the user, their input and the passwords generated. Thus, there is a need for an invention that eliminates the need for any $3^{rd}$ party record of passwords as well as saved hardcopies or digital files, which can be lost, stolen or destroyed. Further, there is a need for an invention that can create passwords that are difficult to hack or guess by allowing the user to input secret information that is easily remembered, such as a secret phrase and pin number.

BRIEF SUMMARY OF THE INVENTION

The present invention seeks to meet these needs by providing a password generation and retrieval system (PGRS) that generates encrypted passwords with a computer program using an algorithm that combines a website information such as a domain name or email address, the user's own text input or phrase, and the user's own numeric value or pin number. The present invention does not involve the maintenance of a database of any kind. As such, there is no login required and no records are kept of the visitors, their input or the passwords generated. Preferably, the process is carried out using a website, browser extension, smart phone application and/or a stand-alone executable program.

BRIEF DESCRIPTION OF THE DRAWINGS

The FIGURE is flowchart example of the PGRS, utilized to implement an illustrative embodiment of the present invention.

DETAILED DESCRIPTION

The PGRS is illustrated as a sequence of processes as shown in the FIGURE In Step One, the user inputs the domain name, URL of the website or email address for which they want to create a strong encrypted password. In Step Two, the user inputs a free flow text of their own easy to remember secret phrase. In Step Three, the user inputs a secret number between 1 and 99999. In Step Four, the system can be customized to include additional input requirements for the password creation. For example, many websites require passwords to contain a certain number of characters, a combination of upper and lowercase letters, or even symbols. As shown in the FIGURE, in Step Four (A) thru (D), the user is prompted to enter additional options that can be customized to meet website password requirements. As shown in "A", the user may select a month and year for a date specific password, as in some cases a website, such as a bank, may require a new password every 30 days. As shown in "B", the user must select the first character in the password as a lower case, upper case or numeric character. As shown in "C", the minimum or exact number of characters can be specified. As shown in "D", a limitation of only alphanumeric characters in the password can be implemented (i.e. no symbols such as #, %, *) The number of options and/or limitations provided in Step Four are not limited to those state herein, as they could be customized to each specific website requirements. In Step Five, the results are combined and processed through an encryption algorithm to create a unique password.

A further embodiment of the present invention is to provide hash tags within a link such that webmasters can specify which options or limitations to the password generation the website accommodates. For example, a website may offer their users a "Visit WordCrypt to create your Password" link as https://wordcrypt.com/#lower-char25-alphanum which would specify first character lower case, 25 characters, and no special characters.

One key novel aspect of the present invention is that even though the user has not created a login account that keeps record of the user, every time the user inputs the same domain name, secret phrase and secret number, the same password is created. The user is able to maintain anonymity and the PGRS compiles and encrypts the user data into a unique password just for that domain name, user phrase and number. As such, the user is able to save a difficult password for each website using easy to remember information to retrieve the password, thereby eliminating the need for sticky notes, Word docs, spreadsheets, notepad files and 3rd party database depositories.

In the preferred embodiment, the password encryption system is practiced using a website to compile the input details and provide the encrypted password. However, the present invention may also be practiced in other formats such as browser extension (Chrome, Firefox, Internet Explorer, Opera, and Safari), smart phone applications (Android, iPhone, Blackberry and Windows phones), and/or stand alone executable programs (Windows, Mac, and Linux).

In the preferred embodiment, the algorithm used to encrypt the password is an irreversible cryptographic hash function that generates passwords and then transmits them through the Secure Socket Layer protocol, which creates an encrypted connection between the user's computer and the website server. However, it is understood that many different types of encryption methods, those known and unknown, can function with the PGRS of the present invention.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A universal password generation and retrieval system comprising:
    a computer executing a computer program to combine and process website data and unique user identification data through an encryption algorithm;
    a first input interface module for a user to enter the website data;
    a second input interface module for the user to enter the unique user identification data;
    a third input interface module for including a password restriction customized to meet a website requirement;
    the program combines and processes the website data, the unique user identification data and the password restriction customized to meet a website requirement through the encryption algorithm to create a unique password; and
    a recall interface module executed by the computer to use input of the original website data and the unique user identification data to recall the unique password from the computer.

2. The universal password generation and retrieval system of claim 1 wherein the password restriction customized to meet the website requirement allows a user to select the time limited specific password.

3. The universal password generation and retrieval system of claim 1 wherein the password restriction customized to meet the website requirement allows the user to specify alphanumeric restrictions selected from a group comprising capitalization, character length, character type and combinations thereof.

4. The universal password generation and retrieval system of claim 1 wherein the website data is comprised of a website domain name.

5. The universal password generation and retrieval system of claim 1 wherein the website data is comprised of an email address.

6. The universal password generation and retrieval system of claim 1 wherein the unique user identification data is comprised of information selected from a group comprising a free flow text phrase, a numerical value or combinations thereof.

7. The universal password generation and retrieval system of claim 1 wherein the encryption algorithm utilizes a cryptographic hash function within its formula.

8. A universal password generation and retrieval system comprising:
    a computer executing a computer program to combine and process website data and unique user identification data through an encryption algorithm;
    a first input interface module for a user to enter the website data;
    a second input interface module for the user to enter the unique user identification data;
    a third input interface module for including a password restriction customized to meet a website requirement;
    the program combines and processes the website data, the unique user identification data and the password restriction customized to meet the website requirement through the encryption algorithm to create a unique password;
    a recall interface module executed by the computer to use input of the original website data and the unique user identification data to recall the unique password from the computer; and
    the password restriction customized to meet the website requirement allows a user to select a time limited specific password.

9. The universal password generation and retrieval system of claim 8 wherein the password restriction customized to meet the website requirement allows a user to specify alphanumeric restrictions selected from a group comprising capitalization, character length, character type and combinations thereof.

10. The universal password generation and retrieval system of claim 8 wherein the website data is comprised of a website domain name.

11. The universal password generation and retrieval system of claim 8 wherein the website data is comprised of an email address.

12. The universal password generation and retrieval system of claim 8 wherein the unique user identification data is comprised of information selected from a group comprising a free flow text phrase, a numerical value or combinations thereof.

13. The universal password generation and retrieval system of claim 8 wherein the encryption algorithm utilizes a cryptographic hash function within its formula.

14. A universal password generation and retrieval system comprising:
   a computer executing a computer program to combine and process website data and unique user identification data through an encryption algorithm;
   a first input interface module for a user to enter the website data;
   a second input interface module for the user to enter the unique user identification data;
   a third input interface module for including a password restriction customized to meet a website requirement;
   the program combines and processes the website data, the unique user identification data and the password restriction customized to meet a website requirement through the encryption algorithm to create the unique password;
   a recall interface module executed by the computer to use input of the original website data and unique user identification data to recall the unique password from the computer; and
   the password restriction customized to meet the website requirement allows a user to specify alphanumeric restrictions selected from a group comprising capitalization, character length, character type and combinations thereof.

15. The universal password generation and retrieval system of claim 14 wherein the password restriction customized to meet the website requirement allows a user to select a time limited specific password.

16. The universal password generation and retrieval system of claim 14 wherein the website data is comprised of a website domain name.

17. The universal password generation and retrieval system of claim 14 wherein the website data is comprised of an email address.

18. The universal password generation and retrieval system of claim 14 wherein the unique user identification data is comprised of information selected from a group comprising a free flow text phrase, a numerical value or combinations thereof.

19. The universal password generation and retrieval system of claim 14 wherein the encryption algorithm utilizes a cryptographic hash function within its formula.

\* \* \* \* \*